June 22, 1943. C. B. REDRUP 2,322,468
PRESSURE REDUCING VALVE
Filed July 29, 1942

Inventor
Charles B. Redrup
By Glascock Downing Seebold
Attys.

Patented June 22, 1943

2,322,468

UNITED STATES PATENT OFFICE 2,322,468

PRESSURE REDUCING VALVE

Charles Benjamin Redrup, Middleton, Manchester, England, assignor to A. V. Roe & Company Limited, Middleton, Manchester, England, a British company Application July 29, 1942, Serial No. 452,783
In Great Britain July 2, 1941

1 Claim. (Cl. 50—35)

This invention has for its object to provide an improved pressure reducing valve which will allow a free flow of fluid therethrough when the outlet pressure falls below a predetermined amount, and in addition will provide a reduced rate of pressure reduction in the low pressure range compared with the rate of pressure reduction in the high pressure range for any particular drop in pressure in the fluid supply.

Further objects are to produce a simple compact valve which can be manufactured from plain bar material without the necessity of producing finely finished lapped surfaces to prevent leakage.

In accordance with my invention, a piston of differential areas, one of which forms a valve for controlling the inflow of the fluid whose pressure is being regulated, is held by the inlet pressure, assisted if necessary by a spring, in a position in which said valve is fully open until the outlet pressure from the valve acting on the larger area surface of the piston is able to overcome the pressure on the smaller area surface of the piston, assisted by the spring when such is employed, when the flow past the valve is restricted, so giving the desired reduced outlet pressure.

Figure 1:
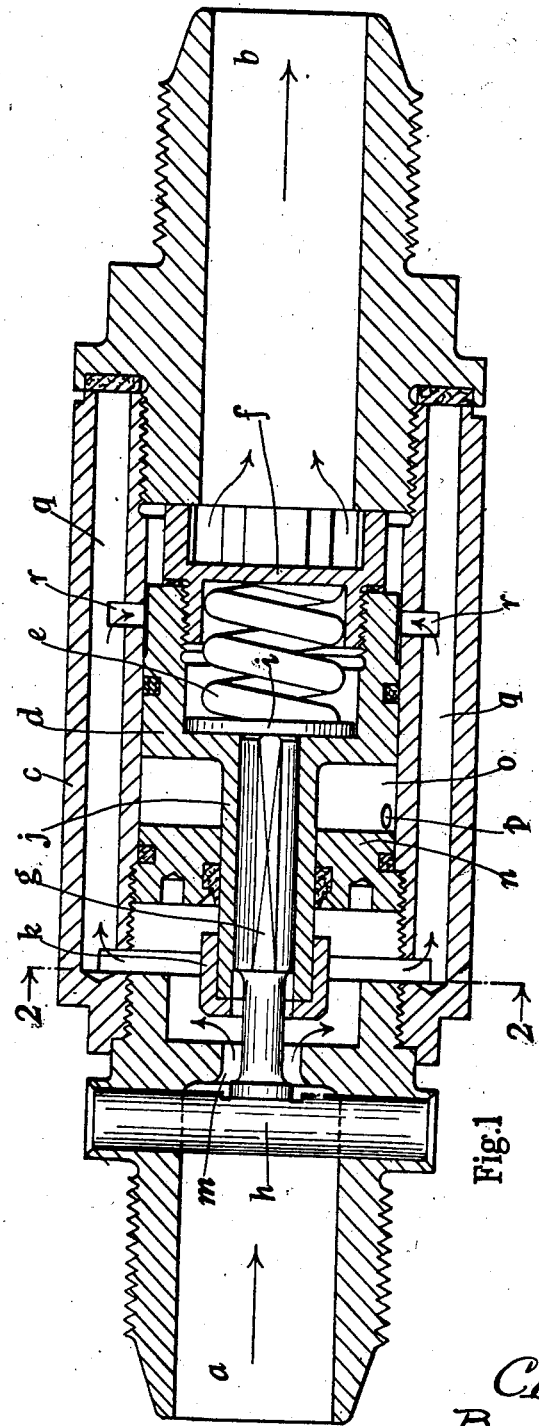
Figure 2:
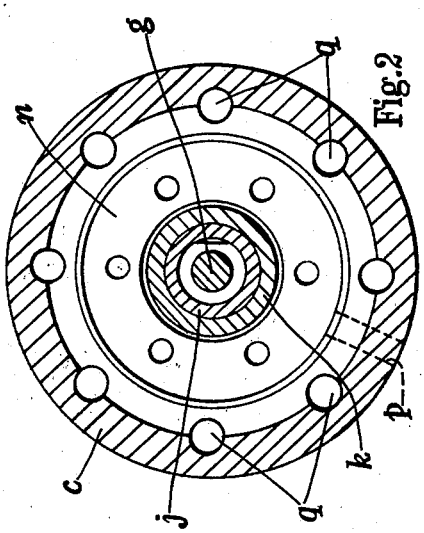

Referring to the accompanying explanatory drawing:

Figure 1 is a longitudinal section and Figure 2 a cross section on the line 2—2 of Figure 1 showing a reducing valve constructed in one convenient form in accordance with this invention.

The inlet to the valve is at $a$ and the outlet therefrom at $b$.

Within the valve casing $c$ which is bored to form a cylinder, is located a hollow piston $d$ having therein a spring $e$ bearing at one end on the cap $f$ by which the piston interior is sealed from outlet pressure, and at the other end on a washer $i$ upon the end of a strut $g$ which abuts against a cross pin $h$ secured in the inlet branch of the valve.

The piston stem $j$ has a cap $k$ thereon which acts as a valve or obturator with reference to the inflow of fluid to the valve by the annular passage $m$. There is a fixed guide wall $n$ for the piston stem $j$, such guide wall being secured in the bore of the casing $c$ and serving to separate the inlet side of the valve from a space $o$ which is open to atmosphere by the tube $p$. It will be seen therefore that one side of the piston is under outlet pressure and the other side under atmospheric pressure, whilst the end of the stem $j$ is under inlet pressure.

The pressure fluid passes from the inlet to the outlet side of the valve by way of the tubular passages $q$, the radial passage or slot $r$ and the clearance around the piston $d$.

In operation, if the outlet pressure becomes excessive, such pressure acting upon the closed large diameter end of the piston $d$ overcomes the inlet pressure plus the pressure of the spring $e$ and moves the piston towards the valve inlet end, so causing the cap $k$ to restrict the flow of pressure fluid through the passage $m$. When the outlet pressure falls, the piston moves towards the outlet end of the valve so that the area for inflow of fluid from the passage $m$ is increased.

It will be appreciated that the spring $e$ is not necessary to the functioning of the valve. The use of the small spring shown enables a lesser rate of pressure drop at the outlet side to result from a pressure drop at the inlet side than would be the case if no spring were used.

The improved valve is extremely compact and light in weight and can be made from plain bar material. It can be readily fitted in a pipe line without any further connection. The avoidance of the use of a large spring for controlling the valve action, facilitates the production of the compact design illustrated.

What I claim is:

A pressure reducing valve comprising, in combination, a casing with a cylindrical bore therethrough and tubular passages in the wall of the casing communicating with the bore towards its opposite ends, a piston in said bore including a head and a stem, a fixed guiding and division wall in said bore through which the piston stem passes, means for placing the space between said wall and the piston head under atmospheric pressure, a fluid inlet to the center of one end of said bore and registering with and constructed and arranged to be restricted by the adjacent outer end of the piston stem, a fluid outlet from the other end of said bore and adjacent the outer face of the piston head and communicating with the tubular passages by a clearance between a part of the piston head and the wall of the bore of the casing, an abutment in the fluid inlet, a strut extending co-axially through the piston stem and bearing at one end upon said abutment, and a spring within the piston head and exerting pressure upon the other end of said strut and acting to oppose the outlet pressure.

CHARLES BENJAMIN REDRUP.